United States Patent
Kida et al.

(10) Patent No.: US 6,985,128 B1
(45) Date of Patent: Jan. 10, 2006

(54) LIQUID CRYSTAL DISPLAY PANEL AND PRODUCTION METHOD OF THE SAME, AND LIQUID CRYSTAL DISPLAY APPARATUS

(75) Inventors: Yoshitoshi Kida, Kanagawa (JP);
Yoshiharu Nakajima, Kanagawa (JP);
Naoshi Goto, Kanagawa (JP);
Toshikazu Maekawa, Kanagawa (JP);
Hideo Kataoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 10/089,230

(22) PCT Filed: Jul. 30, 2000

(86) PCT No.: PCT/JP01/06547

§ 371 (c)(1),
(2), (4) Date: Jul. 22, 2002

(87) PCT Pub. No.: WO02/10851

PCT Pub. Date: Feb. 7, 2002

(30) Foreign Application Priority Data

Jul. 31, 2000 (JP) .............................. 2000-230993
Jul. 31, 2000 (JP) .............................. 2000-231013

(51) Int. Cl.
*G09G 3/36* (2006.01)
(52) U.S. Cl. ....................... 345/98; 345/205
(58) Field of Classification Search .......... 345/87–100, 345/205, 206
See application file for complete search history.

(56) References Cited

U.S. PATENT DOCUMENTS

| 5,241,304 | A | * | 8/1993 | Munetsugu et al. | ........... 345/98 |
| 5,841,414 | A | * | 11/1998 | Tanaka | ........... 345/87 |
| 5,926,157 | A | * | 7/1999 | Moon | ........... 345/89 |
| 5,945,984 | A | * | 8/1999 | Kuwashiro | ........... 345/206 |
| 5,953,003 | A | * | 9/1999 | Kwon et al. | ........... 345/204 |
| 6,670,940 | B2 | * | 12/2003 | Kim | ........... 345/98 |
| 6,771,239 | B1 | * | 8/2004 | Uchiyama | ........... 345/87 |

FOREIGN PATENT DOCUMENTS

| JP | 1-130132 | 5/1989 |
| JP | 4-288588 | 10/1992 |
| JP | 10-10546 | 1/1998 |
| JP | 2000-131709 | 5/2000 |

* cited by examiner

*Primary Examiner*—Xiao Wu
*Assistant Examiner*—Jean Lesperance
(74) *Attorney, Agent, or Firm*—Rader, Fishman & Grauer Pllc; Ronald P. Kananen

(57) ABSTRACT

The present invention is directed to a liquid crystal display panel to which an external horizontal drive circuit is connected in a TAB, COG, or other form. The liquid crystal display panel is capable of performing aging by a substrate alone by connecting the external drive circuit. The liquid crystal display panel includes an active matrix display area, a vertical drive circuit, and a horizontal aging circuit that supplies signals to a plurality of source lines at one time provided on a substrate. The medium-sized to small-sized active matrix type liquid crystal display apparatus is used in a PDA applications, among other, and is capable of being produced at a high quality and a low cost without using a time sharing driving method. The active matrix type liquid crystal display apparatus is provided with a horizontal drive circuit as an external circuit, wherein a vertical drive circuit is formed integrally with a liquid crystal display area on a glass substrate by using low temperature PolySi TFTs. The horizontal drive circuit is connected to a liquid crystal display panel substrate by COG. Output terminals of a driver IC constituting the horizontal drive circuit and source lines Ls are in a one-to-one correspondence.

2 Claims, 8 Drawing Sheets

LIQUID CRYSTAL DISPLAY PANEL AND PRODUCTION METHOD OF THE SAME, AND LIQUID CRYSTAL DISPLAY APPARATUS

TECHNICAL FIELD

The present invention relates to a liquid crystal display panel of an active matrix display, to be used connected to an external horizontal drive circuit or vertical drive circuit, provided with an aging circuit on a substrate thereof so that aging can be performed at the substrate of the liquid crystal display panel alone without connecting to the external horizontal drive circuit or vertical drive circuit, and a method of producing the same.

Further, the present invention relates to a liquid crystal display apparatus provided with a horizontal drive circuit as an external circuit of a liquid crystal display panel.

BACKGROUND ART

Conventionally, in a large-sized liquid crystal display apparatus for an active matrix display, a horizontal drive circuit and vertical drive circuit incorporating driver ICs for applying a predetermined voltage to the pixels are provided by TAB (tape automated bonding) or COG (chip on glass) at the outside of the substrate of the liquid crystal display panel. Further, in a small-sized liquid crystal display apparatus, the horizontal drive circuit is provided outside the substrate of the liquid crystal display panel, while the vertical drive circuit is provided integrally in the substrate of the liquid crystal display panel.

Aging is performed for displaying a predetermined image on the liquid crystal display panel to examine for defects in the panel itself before assembling the liquid crystal display panel into a liquid crystal display apparatus.

However, with a liquid crystal display panel to which external drive circuits are connected by TAB, COG, etc., it is not possible to display an image unless the external drive circuits are connected to the liquid crystal panel. Therefore, aging cannot be performed by the liquid crystal panel alone.

Therefore, there is an inconvenience that drive circuits have to be incorporated in advance as a module in order to perform aging. Furthermore, when the aging reveals any defect, reuse of the TAB, COG, or other circuits incorporated as a module requires that they be removed from the defective panel. This is troublesome. Thus, there was a problem that the work efficiency of aging was low in such liquid crystal display panels.

Also, as explained above, in a large-sized liquid crystal display apparatus for an active matrix display, the horizontal drive circuit and vertical drive circuit incorporating driver ICs for applying a predetermined voltage to the pixels are provided outside the substrate of the liquid crystal display panel by TAB, COG, etc. In this case, there is normally a one-to-one correspondence between the outputs of the external driver IC and source lines of the liquid crystal display panel. The output voltages from the output terminals of the driver ICs are supplied as they are to the corresponding source lines.

On the other hand, in a small-sized liquid crystal display apparatus for active matrix display, a time sharing drive method (selector method) is employed, the horizontal drive circuit is provided as an external circuit, and the vertical drive circuit is integrally provided in the substrate of the liquid crystal display panel.

In the time sharing drive method, a plurality of source lines are treated as one unit, and signals given to the plurality of source lines in a unit are output from the driver IC in a time series. In a liquid crystal display panel, a plurality of source lines are treated as one unit and a time sharing switch is provided, and signals in a time series output from a driver IC are divided in time by the time sharing switch and successively given to the plurality of source lines.

According to the time sharing drive method, the outputs of the driver IC of the external horizontal drive circuit and source lines of the liquid crystal display panel are not in a one-to-one correspondence. For example, a write operation is performed on three source lines by one output line of the driver IC. Accordingly, the number of output pins of the driver IC can be reduced by using the time sharing drive method.

However, in a medium-sized to small-sized liquid crystal display panel used in a PDA etc., the time sharing drive method causes the following problems:

First, since a horizontal writing time is divided in the time sharing drive method, a sufficient writing time to the source lines from the driver IC cannot be secured.

Second, a horizontal drive frequency of the driver IC has to be made higher in accordance with the number of divisions of one horizontal scanning period. For example, when dividing one horizontal scanning period into three equal portions, the driver IC has to operate at three times the horizontal drive frequency of the liquid crystal.

Third, since a pulse is required to make the time sharing switch operate and data has to be rearranged to change the order of writing to the source lines, medium-sized to small-sized liquid crystal display panels require a large power consumption and a memory for rearranging data. These are also problems.

On the other hand, a drive method relying on external circuits for both of the horizontal drive circuit and vertical drive circuit suffers from the problem that with medium-sized to small-sized liquid crystal display panels, it is not possible to take out terminals from one side of the panels. Therefore, the problems arise that the outside shape of a module becomes large and assembly of the module becomes complicated. Furthermore, the number of connection points of the liquid crystal display panel and the outside becomes large, so the probability of a connection defect arising becomes higher.

DISCLOSURE OF INVENTION

A first object of the present invention is to provide a liquid crystal display panel enable panel defects to be found by aging by a panel substrate alone even when image display becomes possible by connecting drive circuits outside and capable realizing a high quality display panel at a low cost and a method of producing the same.

A second object of the present invention is to provide a liquid crystal display apparatus capable of being provided with a horizontal drive circuit as an external circuit without using a time sharing drive method in medium- to small-sized liquid crystal display apparatuses used for PDAs etc.

The present inventors discovered that aging of a liquid crystal panel to which external drive circuits are to be connected can be performed without connecting external drive circuits to the liquid crystal display panel by providing in a substrate of the liquid crystal display panel an aging circuit able to supply signals to a plurality of lines at one time to form a simple image and that consequently the work efficiency of aging can be improved.

Namely, to attain the above objects, the present invention provides a liquid crystal display panel provided with an active matrix display area, a vertical drive circuit, and a horizontal aging circuit for supplying signals to source lines at one time on a substrate of the liquid crystal display panel and provided with a horizontal drive circuit connected externally.

Also, the present invention provides a liquid crystal display panel provided with an active matrix display area, a horizontal drive circuit, and a vertical aging circuit for supplying signals to a plurality of gate lines at one time on a substrate of the liquid crystal display panel and provided with a vertical drive circuit connected externally.

Furthermore, the present invention provides a liquid crystal display panel provided with an active matrix display area, a horizontal aging circuit for supplying signals to a plurality of source lines at one time, and a vertical aging circuit for supplying signals to a plurality of gate lines at one time on a substrate of the liquid crystal display panel and provided with a horizontal drive circuit and vertical drive circuit connected externally.

Also, as a method of producing the above liquid crystal display panel, the present invention provides a method of producing a liquid crystal display panel comprising forming a horizontal aging circuit or a vertical aging circuit in a process of forming an active matrix display area on a substrate.

Also, to attain the above objects, the present invention provides an active matrix type liquid crystal display apparatus, wherein a vertical drive circuit is formed integrally with a liquid crystal display area on a glass substrate using low temperature polySi TFTs, a horizontal drive circuit is connected to a liquid crystal display panel substrate by COG, and output terminals of a driver IC constituting the horizontal drive circuit and source lines are in a one-to-one correspondence.

According to the liquid crystal display apparatus of the present invention, since a time sharing driving method is not used and the output terminals of a driver IC constituting the horizontal drive circuit and source lines are in a one-to-one correspondence, all of a horizontal scanning period can be used for writing to one source line and the image quality can be improved. Also, the output necessary for the driver IC of the horizontal drive circuit can be made smaller compared with that in a time sharing driving method, and also it is not necessary to provide a time sharing switch, so a lower power consumption of the overall system can be achieved. Furthermore, rearrangement of signals and a memory required in the time sharing driving method become unnecessary in the present invention.

Furthermore, by providing a horizontal drive circuit having a high frequency, which is strongly required not to have any unevenness in characteristics, as an external circuit, the quality of the horizontal drive circuit can be checked before mounting it on the liquid crystal display panel, so the yield of liquid crystal display panels can be improved and a high quality product can be provided at a lower cost.

Also, compared with the method relying on external circuits for both of the horizontal drive circuit and the vertical drive circuit, the number of connection points are small, so the yield of the products can be improved.

Since the vertical drive circuit can be formed integrally on the substrate of the liquid crystal display panel, the frame can be made smaller compared with the method relying on external circuits for both of the horizontal drive circuit and the vertical drive circuit.

BEST MODE FOR CARRYING OUT THE INVENTION

Figure 1:
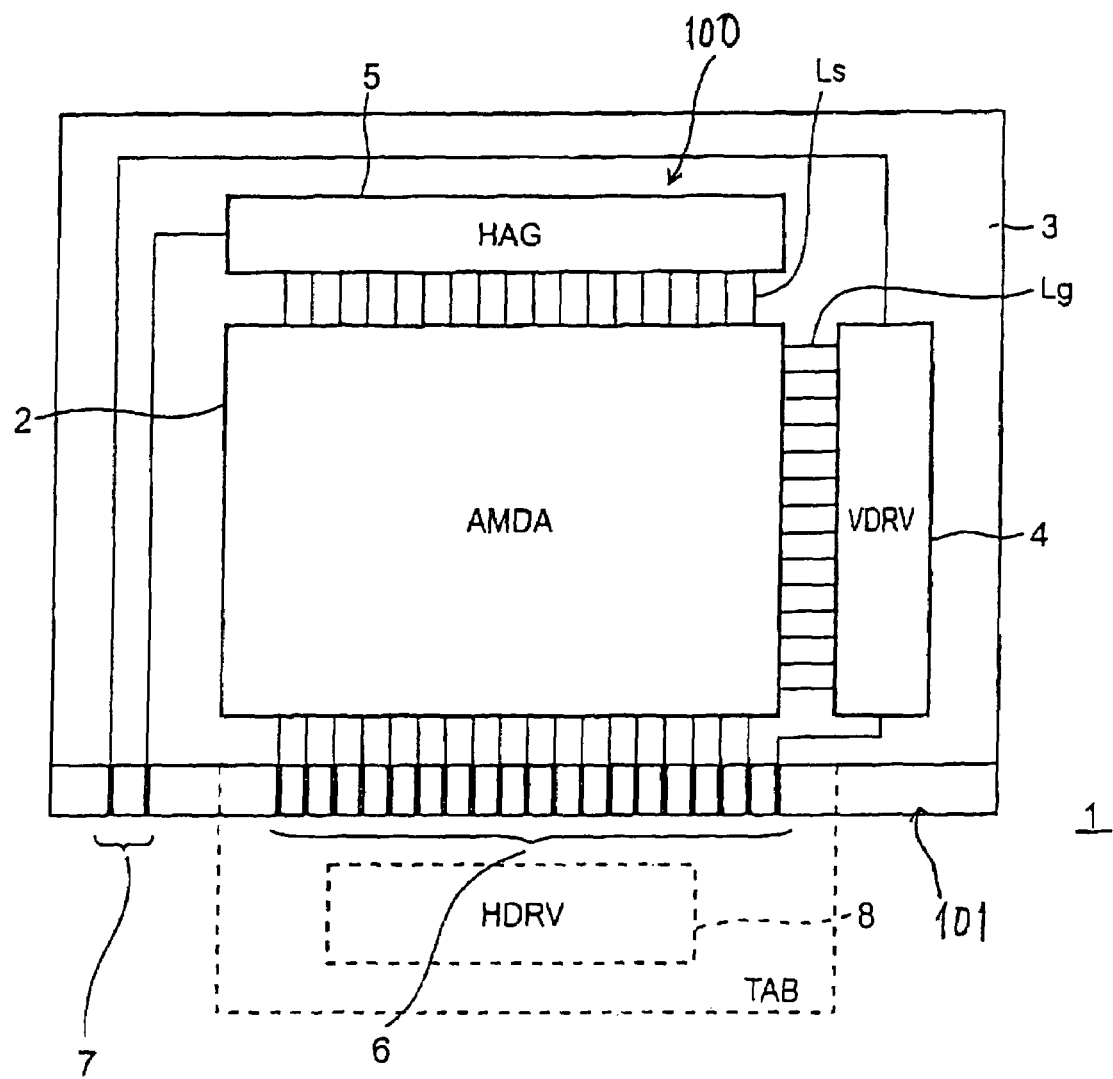
FIG. 1 is a view of a circuit layout of a liquid crystal display panel according to the present invention.

Below, the present invention will be explained with reference to the drawings. Note that identical reference numbers in the drawings indicate identical or equivalent components.

FIG. 1 is a view of a circuit layout of a liquid crystal display panel according to the present invention.

In the liquid crystal display panel 1, as shown in FIG. 1, a vertical drive circuit (VDRV) 4, a horizontal aging circuit (HAG) 5, a first pad region 6 having narrow pitches, and a second pad region 7 are provided on a glass substrate 3 around an active matrix display area (AMDAS) 2 configured by using TFTs (thin film transistors).

Here, the vertical drive circuit 4 successively gives scanning pulses to the gate lines Lg and selects pixels in units of lines to perform vertical scanning.

The horizontal aging circuit 5 supplies signals to a plurality of source lines Ls at one time.

Figure 2:
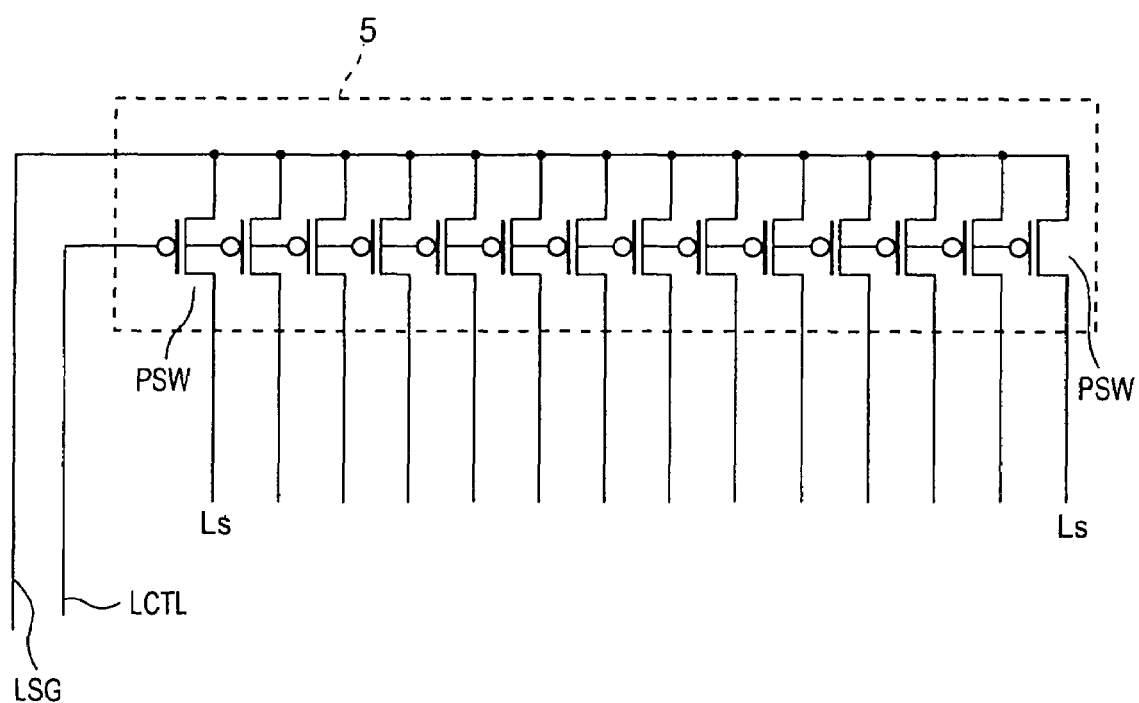
FIG. 2 is a view of an example of the configuration of a horizontal aging circuit according to the present invention.

The horizontal aging circuit 5, for example, as shown in FIG. 2, is provided with PMOS switches PSW, comprised of p-channel MOS (PMOS) transistors whose gates are connected to a control signal line LCTL, between all source lines Ls and one signal line LSG and is configured so that all source lines Ls can be driven by one interconnection.

Note that since the horizontal aging circuit 5 is provided on a seal region 100 of the liquid crystal display panel 1, there is no disadvantage of the external size becoming larger due to formation of the horizontal aging circuit 5. The first pad region 6 and the second pad region, as shown in FIG. 1, are formed in parallel at a first edge portion 101 of the glass substrate 3.

The first pad region 6, as shown in FIG. 1, has mounted on it the horizontal drive circuit (HDRV) 8 in a TAB form at the time of actual use. Therefore, the first pad region 6 is provided with several hundreds of pads at pitches of about 80 $\mu$m corresponding to the source lines for the number of horizontal dots of the active matrix display area 2 and interconnections for vertical driving.

On the other hand, the second pad region 7 corresponds to the horizontal aging circuit 5 which drives all source lines Ls with one interconnection and is provided with not more than 10 pads including interconnections for vertical driving at pitches of about 500 $\mu$m.

Thus, the pads and external horizontal drive circuit can be easily connected by bringing them into abutment by the naked eye.

As an example of the configuration of such a second pad region 7, for example, the following may be mentioned:
1 pin=VDD (vertical drive circuit use power source)
2 pin=GRD
3 pin=VSS2 (vertical drive circuit use negative power source)
4 pin=VST (vertical drive circuit use signal)
5 pin=VCK (vertical drive circuit use signal)
6 pin=ENB (vertical drive circuit use signal)
7 pin=VCOM (counter potential)
8 pin=SIG (aging signal)
9 pin=switching between actual use mode (DC VDD:9V) and aging mode (DC VSS2:−6.5V)

FIGS. 3A to 3E are timing charts for when performing aging on this liquid crystal display panel 1. The timing charts indicate a case of VCOM inversion driving wherein a counter potential (VCOM) is inverted for every horizontal scanning period.

Figure 3:
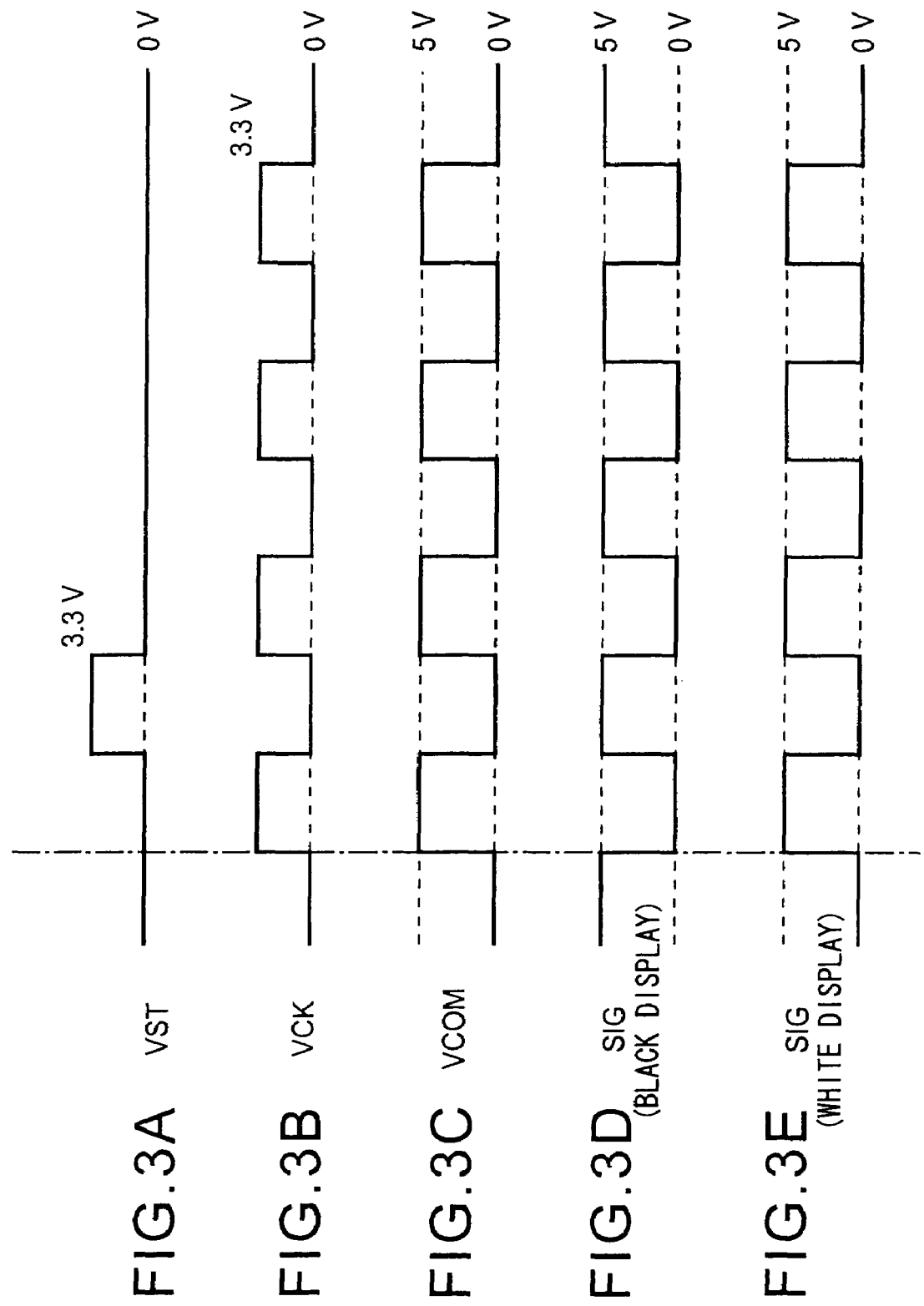
FIGS. 3A to 3E are timing charts at the time of aging.

Note that FIG. 3C to FIG. 3E show VCOM and SIG switching between a solid line and dotted line for every field scanning period.

Figure 4:
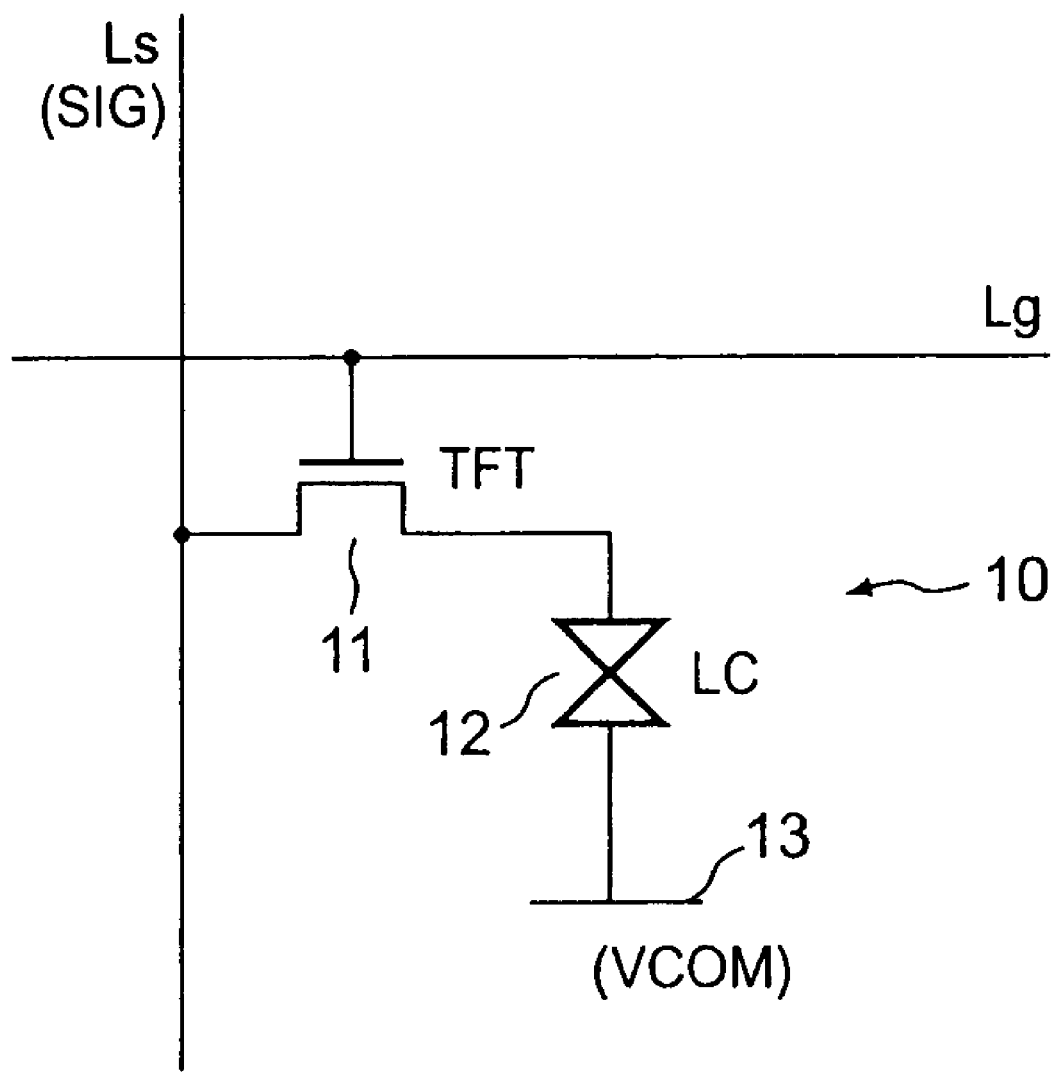
FIG. 4 is a circuit diagram of a example of the configuration of a pixel cell of an active matrix display area.

FIG. 4 is a circuit diagram of an example of the configuration of a pixel cell of an active matrix display area.

The pixel cell 10 is, as shown in FIG. 4, comprised of a TFT 11, a liquid crystal element (LC) 12, and a counter electrode (VCOM) 13. Such pixel cells are arranged in a matrix in the active matrix display area.

In the pixel cell 10, a gate of the TFT 11 is connected to a gate line Lg, a source is connected to a source line Ls, and a drain is connected to a pixel electrode.

In a pixel cell configured as such, as shown in FIG. 4, the difference between the aging signal SIG supplied to the source line Ls and the counter potential VCOM becomes the potential applied to the liquid crystal, so, as shown in FIG. 3C to FIG. 3E, by cyclically changing the VCOM and SIG for alternating driving, polarization of liquid crystal molecules can be prevented and the image quality can be improved.

As explained above, according to the liquid crystal display panel 1, the horizontal aging circuit 5 and the vertical drive circuit 4 can be driven for white display and black display by using only the second pad region 7, i.e., even without using the first pad region 6, so aging for examining for defects of the panel itself can be performed.

Accordingly, it becomes unnecessary to mount the horizontal drive circuit 8 before the aging, and the trouble of removing the horizontal drive circuit from a liquid crystal display panel judged to be defective by the aging is also eliminated.

As a result, the work efficiency of aging can be remarkably improved. Furthermore, since aging can be easily performed only by using the second pad region 7, the productivity of liquid crystal display panels can be improved.

The present invention can be modified in various ways so long as no external drive circuit is mounted and an aging circuit is provided on a substrate of the liquid crystal display panel for enabling aging.

Figure 5:
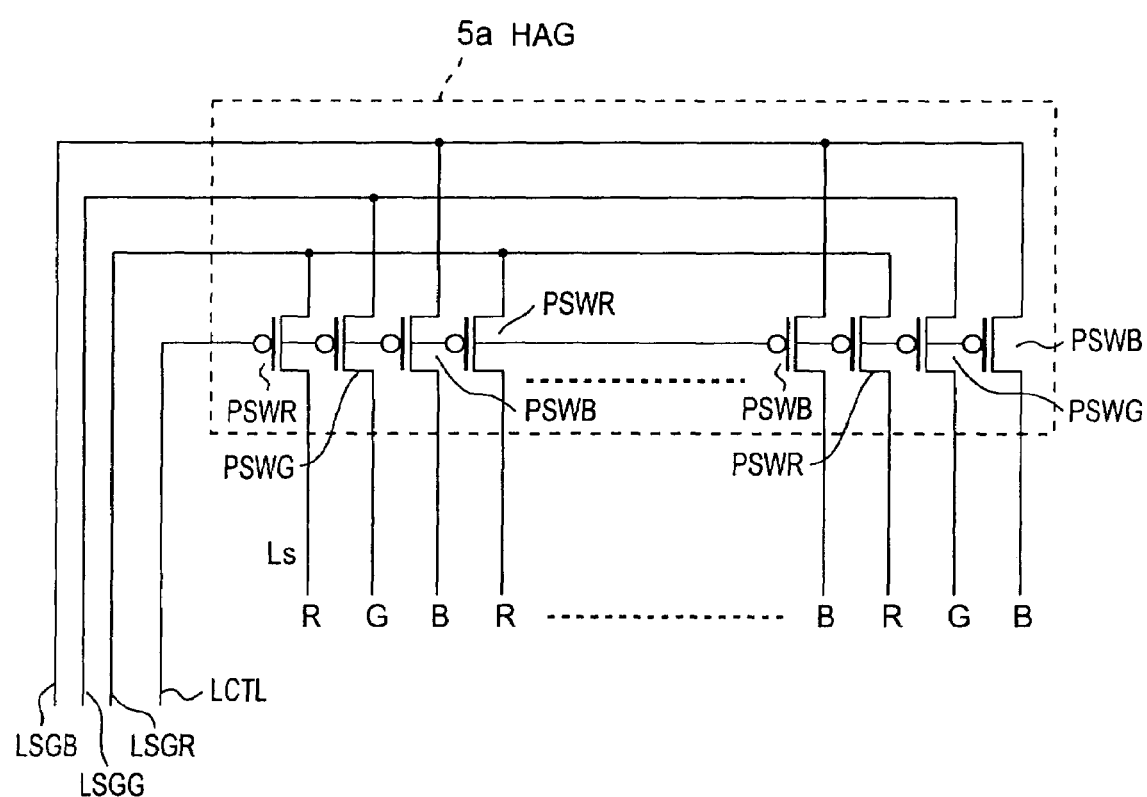
FIG. 5 is a view of another example of the configuration of a horizontal aging circuit according to the present invention.

For example, in the liquid crystal display panel 1 in FIG. 1, the horizontal aging circuit 5 may be configured as shown in FIG. 5.

In a horizontal aging circuit 5a in FIG. 5, source lines are gathered together for each of the three primary colors of R (red), G (green), and B (blue).

By using the horizontal aging circuit 5a, a monochrome raster can be displayed. Furthermore, by introducing a horizontal shift register circuit etc. to the horizontal aging circuit, a more complex image can be displayed at the time of aging.

In the aging circuit 5 shown in FIG. 2, the source lines Ls are provided only with PMOS switches, but it is also possible to provide as switching means of the source lines Ls only NMOS switches comprised of n-channel MOS (NMOS) transistors or to provide CMOS switches.

Also, the mode of connection of the external horizontal drive circuit and liquid crystal display panel is not limited to TAB. It may be COG etc. as well.

Figure 6:
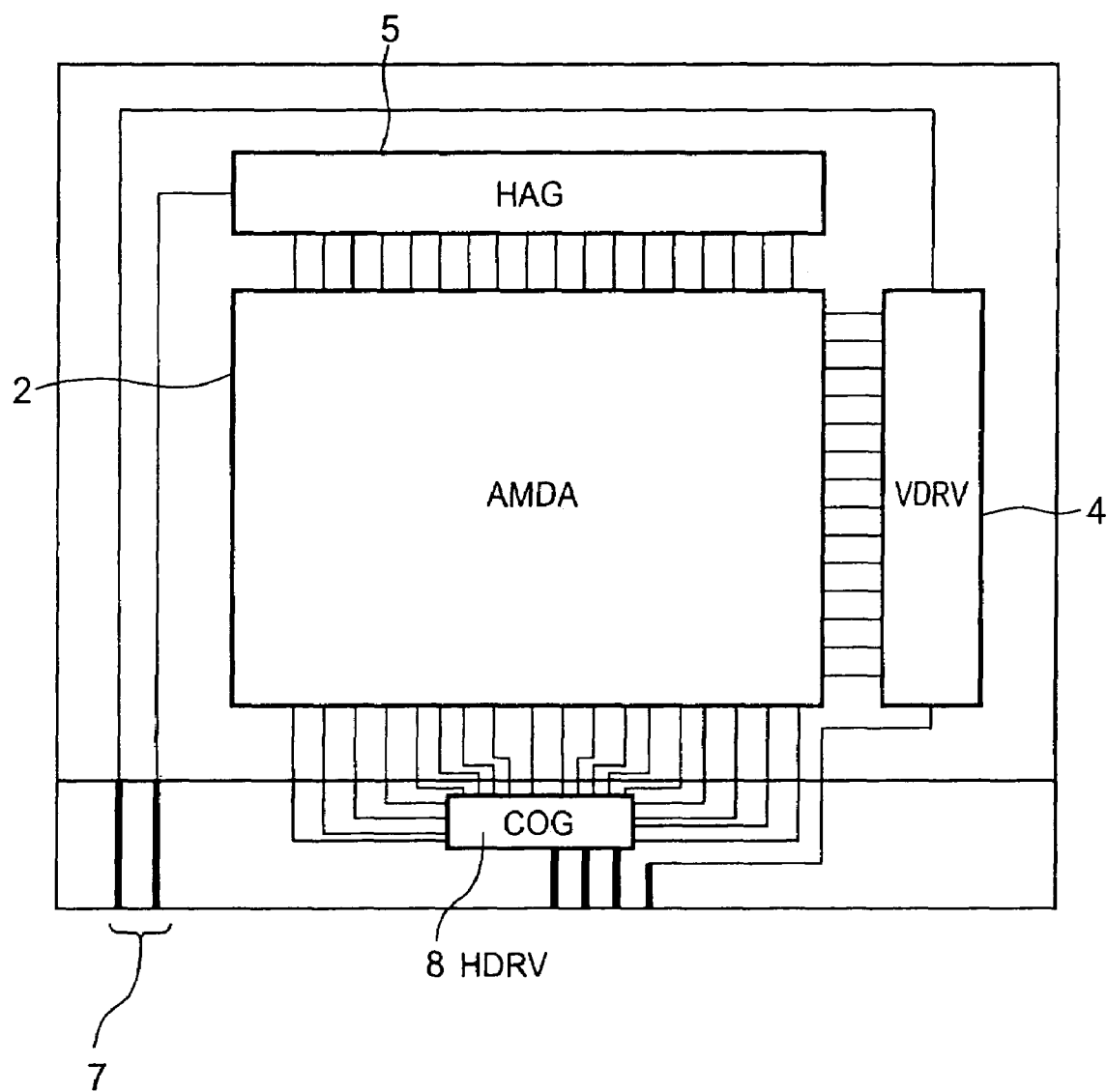
FIG. 6 is a view of another example of a circuit layout of a liquid crystal display panel according to the present invention.

FIG. 6 is a view of an example of the configuration of a circuit layout of a liquid crystal display panel when connecting an external drive circuit by COG.

Furthermore, as shown in FIG. 6, when a horizontal drive circuit is connected as an external circuit to the liquid crystal display panel, a horizontal aging circuit is provided on the substrate of the liquid crystal panel as explained above, while when a vertical drive circuit is connected as an external circuit to the liquid crystal display panel, a vertical aging circuit is provided on the substrate of the liquid crystal display panel in the same way.

Also, when both of a horizontal drive circuit and a vertical drive circuit are connected as external circuits, both of a horizontal aging circuit and a vertical aging circuit are provided on the substrate of the liquid crystal display panel.

In this case, as a vertical aging circuit, one which gathers together a plurality of gate lines by switching means such as CMOS switches, NMOS switches, or PMOS switches and supplies signals to the gathered lines is provided.

As a method of producing a liquid crystal display panel of the present invention provided with a horizontal aging circuit or a vertical aging circuit or both on a substrate of the liquid crystal display panel, it is sufficient to also form the horizontal aging circuit or vertical aging circuit in the process of forming the active matric display area on the substrate by the following well known method.

Accordingly, the liquid crystal display panel of the present invention can be produced by a production method similar to that of a conventional liquid crystal panel for active matrix display, so there is no disadvantage of an increase of steps by providing the horizontal aging circuit or vertical aging circuit.

As explained above, according to the present embodiment, instead of an external horizontal drive circuit or vertical drive circuit, an aging circuit is provided on the substrate of the liquid crystal display panel, therefore it is possible to perform aging and find potential panel defects by the substrate of the liquid crystal display panel alone. Therefore, a high quality liquid crystal display panel can be supplied at a low cost.

Next, an explanation will be given of a liquid crystal display apparatus wherein a vertical drive circuit is integrally formed with the liquid crystal display area by using low temperature polycrystalline silicon (PolySi) TFTs, a horizontal drive circuit is connected to a liquid crystal display panel substrate by COG, and the output terminals of a driver IC composing the horizontal drive circuit and source lines are in a one-to-one correspondence.

Figure 7:
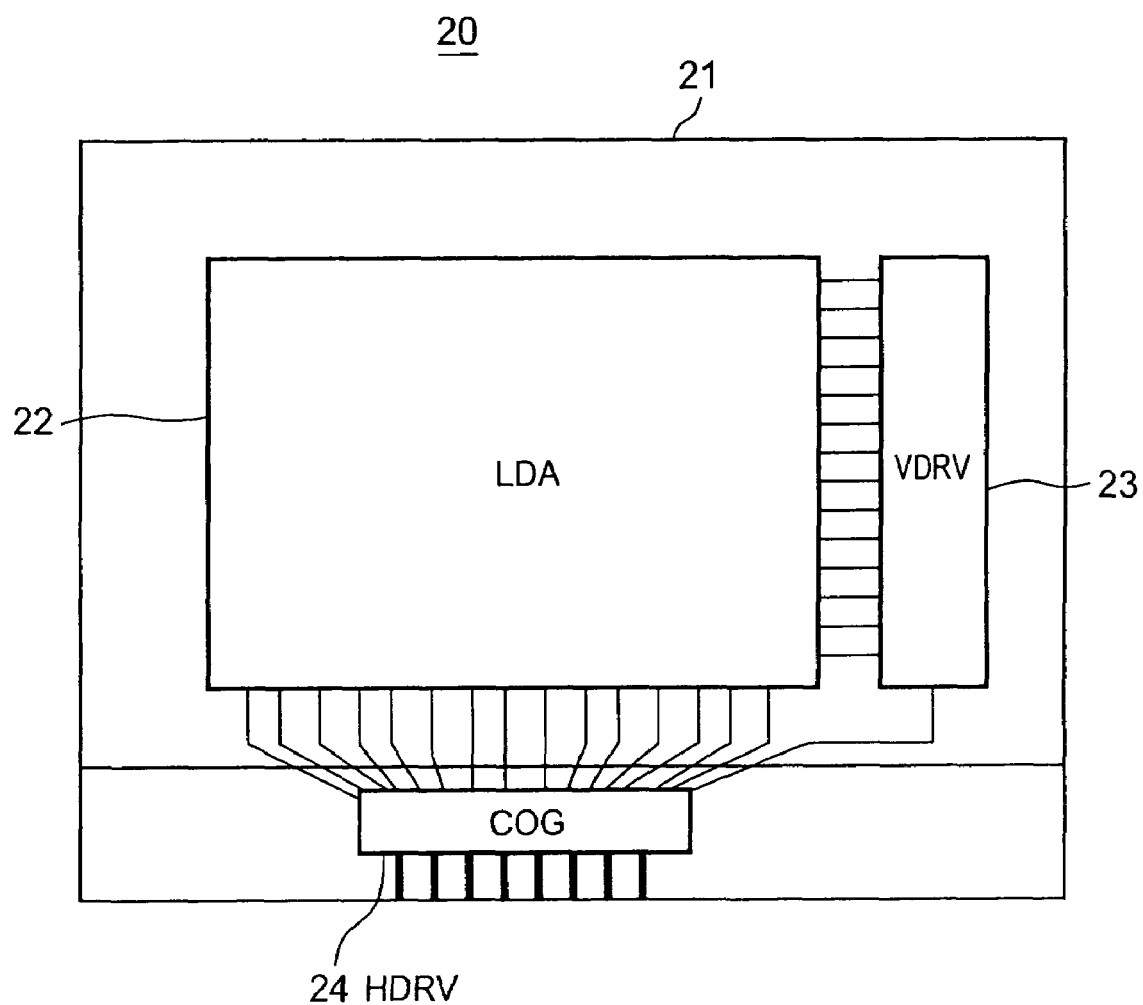
FIG. 7 is a block diagram of a liquid crystal display apparatus according to the present invention.

FIG. 7 is a block diagram of a liquid crystal display apparatus 20 of an embodiment of the present invention.

The liquid crystal display apparatus 20 comprises a liquid crystal display area (LDA) 22 formed on a glass substrate 21 by using low temperature polySi TFT, a vertical drive circuit 23 formed integrally with the liquid crystal display area 22 by using low temperature polySi TFTs, and an external horizontal drive circuit (HDRV) 24 mounted by COG.

Figure 8:
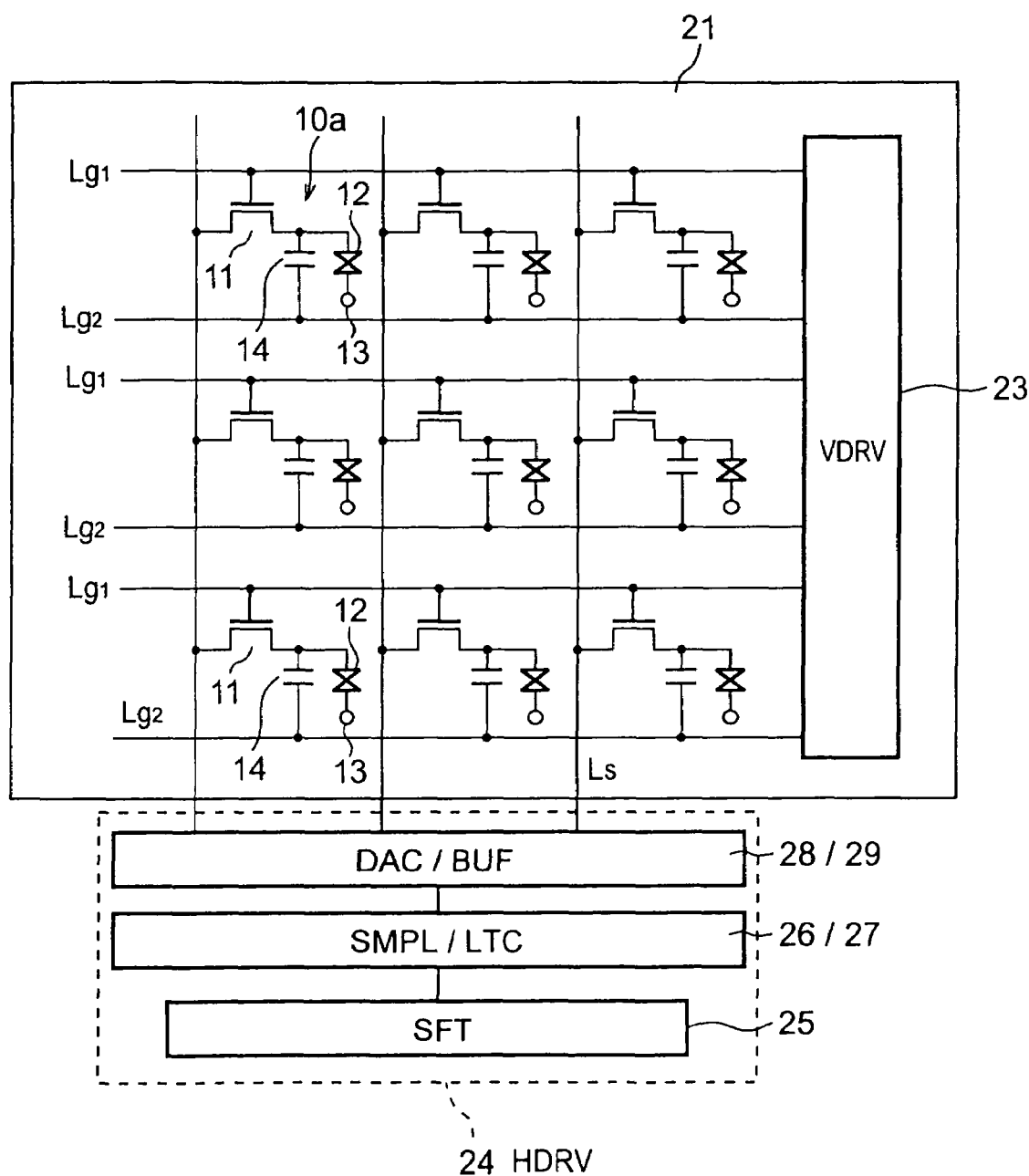
FIG. 8 is a view of another specific example of a circuit layout of a liquid crystal display apparatus in FIG. 7.

FIG. 8 is a view of a specific circuit example of the liquid crystal display apparatus 20 of FIG. 7.

The source lines of the liquid crystal display apparatus 20 are driven by a shift register circuit (SFT) 25, a sampling circuit (SMPL) 26, a latch circuit (LTC) 27, a digital/analog conversion circuit (DAC) 28, and an output buffer circuit (BUF) 29 configured in the driver IC of the COG connected horizontal drive circuit 24.

Here, the shift register 25 successively outputs horizontal scanning pulses to perform horizontal scanning.

The sampling circuit 26 performs successive sampling on a digital image data input here in correspondence with the horizontal scanning pulses from the shift register circuit 25. The image data sampled in the sampling circuit 26 is stored for an amount of one horizontal period in the latch circuit 27.

In the DAC 28, digital data of one horizontal period output from the latch circuit 27 is converted to an analog signal and output. The output from the output buffer circuit 29 is led to the source lines Ls of the liquid crystal display panel as it is. The output to the source lines Ls continues for one horizontal scanning period.

Consequently, in the liquid crystal display apparatus 20, the output terminals of the driver IC constituting the horizontal drive circuit-24 and the source lines are in a one-to-one correspondence.

On the other hand, the vertical drive circuit 23 opens the TFT switch 11 for every gate line Lg in synchronization with switching of the source lines Ls. As a result, writing is performed in the order of the lines for every horizontal scan of the pixels.

Note that in each pixel cell 10a shown in FIG. 8, in addition to the configuration in FIG. 4, a first electrode is connected to a connection point of a drain of the TFT and a pixel electrode, and a second electrode has a held capacity 14 connected to the gate line Lg.

In the liquid crystal display apparatus 20, as the driving method of the liquid crystal, alternating driving wherein the voltage applied to the liquid crystal is inverted each field is preferable.

In the liquid crystal display panel, the number of connection points with an external circuit is the total of the amount of source lines of effective pixels on the horizontal drive circuit 24 side and about 10 pins for the vertical drive circuit 23.

More specifically, for example, the number of connection points becomes 320 pins in a liquid crystal display panel having 100×100 effective pixels. Accordingly, it is possible to gather together the connection pins at only one side of the four-sided liquid crystal display panel to mount an external circuit.

In the liquid crystal display apparatus 20, the vertical drive circuit 23 and the liquid crystal display area 22 are formed integrally on the glass substrate 21 by using low temperature polySi TFTs. Compared with high temperature polySi using a quartz glass substrate and requiring a 1000° C. or more high temperature film-forming technique, low temperature polySi TFTs can be produced by a 450° C. or less low temperature film forming technique, so a normal glass substrate can be used instead of a quartz glass substrate.

Accordingly, the liquid crystal display apparatus of the present invention can be produced at a low cost from this viewpoint as well.

Note that in the present invention, the TFTs formed by the low temperature polySi may be top gate types or bottom gate types.

Also, in the present invention, the horizontal drive circuit is connected to the liquid crystal display panel substrate by COG. Thus, there is some degree of freedom in mounting compared with a case of connecting the horizontal drive circuit by TAB and also the LCD module can be made smaller.

As explained above, since the liquid crystal display apparatus of the present invention does not use a time sharing driving method and has the horizontal drive circuit as an external circuit, the image quality can be improved. Also, the yield of products is improved and production at a low cost can be attained. Particularly, the liquid crystal display apparatus of the present invention is advantageous as a medium-to small-sized liquid crystal display apparatus used for a PDA etc.

INDUSTRIAL APPLICABILITY

As explained above, according to the liquid crystal display panel of the present invention, an aging circuit is provided on a substrate of the liquid crystal display panel instead of an external horizontal drive circuit or a vertical drive circuit, so aging can be performed by the substrate of the liquid crystal display panel alone, potential panel defects can be found, and a high quality liquid crystal display panel can be supplied at a low cost.

Also, according to the liquid crystal display apparatus according to the present invention, since a time sharing driving method is not used and a horizontal drive circuit is provided as an external circuit, the image quality can be improved, the yield of products is improved, and production at a low cost can be attained.

The invention claimed is:

1. A liquid crystal display panel comprising:
   a plurality of source lines;
   a plurality of gate lines;
   an active matrix display;
   a vertical drive circuit;
   a first pad area;
   a second pad area;
   a seal area; and
   a horizontal aging circuit formed on a substrate of the liquid crystal display panel, wherein
   the plurality of source lines and gate lines are laid out on the liquid crystal display panel so that the source lines and gate lines intersect,
   the active matrix display having a plurality of pixels arranged at each intersection of the source lines and the gate lines such that the plurality of pixels form a matrix,
   the vertical drive circuit selecting each pixel by sequentially applying scan pulses to the gate lines,
   the first pad area is at a first edge portion of the substrate and is connected to a first end of each source line and to a horizontal drive circuit external to the substrate,
   the second pad area is at the first edge portion of the substrate, wherein a pitch of the second pad area is wider than a pitch of the first pad area,
   the horizontal aging circuit is at the seal area, connected to a second end of each source line, and drives all source lines by a signal propagated through a single signal line or three signal lines in response to a control signal on a control signal line, and
   at least one vertical drive line is wired between the second pad area and the vertical drive circuit, and
   one of the control signal line, the single signal line, and the three signal lines are wired between the second pad area and the horizontal aging circuit.

2. A liquid crystal panel display of claim 1, wherein the horizontal aging circuit drives each source line by a signal propagated through the single signal line or the three signal lines in response to the control signal on the control signal line via CMOS switches, NMOS switches, or PMOS switches.

* * * * *

UNITED STATES PATENT AND TRADEMARK OFFICE
CERTIFICATE OF CORRECTION

PATENT NO. : 6,985,128 B1  
APPLICATION NO. : 10/089230  
DATED : January 10, 2006  
INVENTOR(S) : Yoshitoshi Kida It is certified that error appears in the above-identified patent and that said Letters Patent is hereby corrected as shown below:

<u>Title Page:</u>
Item (22) should read as follows:
-- (22) PCT Filed: Jul. 30, 2001 --

Signed and Sealed this

Eighteenth Day of July, 2006

JON W. DUDAS  
*Director of the United States Patent and Trademark Office*